US008215605B1

(12) United States Patent
Shepley

(10) Patent No.: US 8,215,605 B1
(45) Date of Patent: Jul. 10, 2012

(54) MAGNETIC MOUNTING APPARATUS

(76) Inventor: Kenneth J. Shepley, Flourtown, PA (US)

( * ) Notice: Subject to any disclaimer, the term of this patent is extended or adjusted under 35 U.S.C. 154(b) by 0 days.

(21) Appl. No.: 13/408,681

(22) Filed: Feb. 29, 2012

Related U.S. Application Data

(62) Division of application No. 12/507,898, filed on Jul. 23, 2009.

(60) Provisional application No. 61/083,318, filed on Jul. 24, 2008.

(51) Int. Cl.
*F16M 13/00* (2006.01)

(52) U.S. Cl. .......... 248/558; 248/206.5; 248/224.61; 224/562

(58) Field of Classification Search ......... 248/683, 248/206.5, 558, 467, 223.41, 224.61; 224/562
See application file for complete search history.

(56) References Cited

U.S. PATENT DOCUMENTS

| | | | |
|---|---|---|---|
| 2,549,766 A * | 4/1951 | Benson | 248/467 |
| 3,148,856 A | 9/1964 | Orlando | |
| 3,245,165 A | 4/1966 | Podoloff | |
| 4,985,817 A * | 1/1991 | Yale | 362/396 |
| 5,137,158 A | 8/1992 | Brockway | |
| 5,411,231 A | 5/1995 | Buck | |
| 5,682,648 A * | 11/1997 | Miller | 24/5 |
| 5,746,329 A * | 5/1998 | Rondeau | 211/123 |
| 5,755,337 A * | 5/1998 | Linn | 211/13.1 |
| 5,782,445 A * | 7/1998 | Cleek | 248/206.5 |
| 6,305,656 B1 * | 10/2001 | Wemyss | 248/309.4 |
| 6,382,482 B1 * | 5/2002 | Chao | 224/312 |
| 6,561,206 B1 * | 5/2003 | Wilkinson | 135/65 |
| 2002/0162925 A1 * | 11/2002 | Song | 248/223.41 |
| 2004/0173719 A1 * | 9/2004 | Mitchell | 248/311.2 |
| 2007/0131695 A1 * | 6/2007 | Hsing-Hsien | 220/483 |
| 2007/0215772 A1 * | 9/2007 | Nickel | 248/317 |
| 2009/0189034 A1 * | 7/2009 | Bresolin | 248/206.5 |

* cited by examiner

*Primary Examiner* — Bradley Duckworth
(74) *Attorney, Agent, or Firm* — Volpe and Koenig, P.C.

(57) ABSTRACT

A magnetic mounting apparatus, comprising a first modular support member having an interchangeable first module configured to slide onto a second module, and a second support member. The first module includes a first receptacle having a first channel of a first width and a second channel of a second width greater than the first width. The first and second channels form a cavity with an opening at a first surface of the first module and which proceeds toward a second surface of the first module opposite to the first surface. The first module also includes a keyed housing channel and a catch. The second module includes a first magnet and a key for attachment to the first module. The second support member includes a second magnet that is oriented to mate with the first magnet of the first modular support member.

13 Claims, 5 Drawing Sheets

Figure 4:
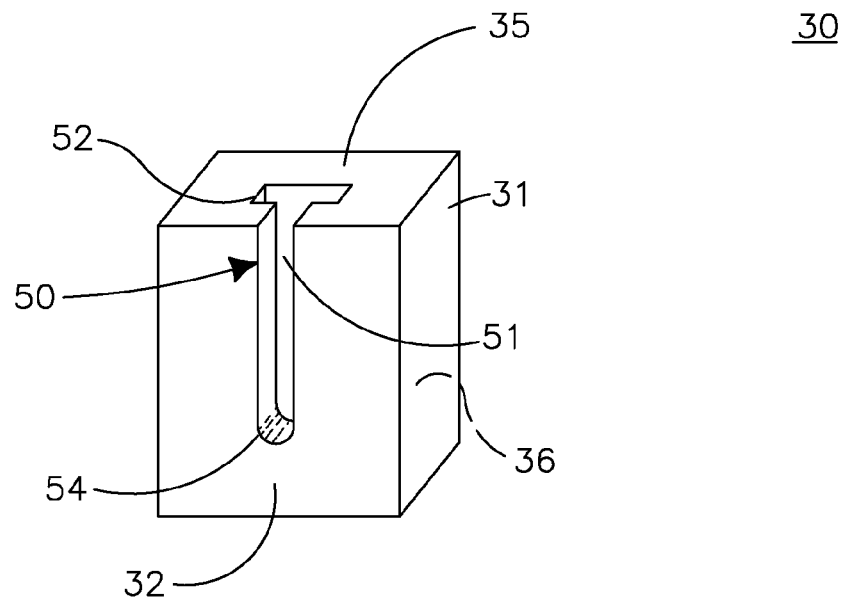

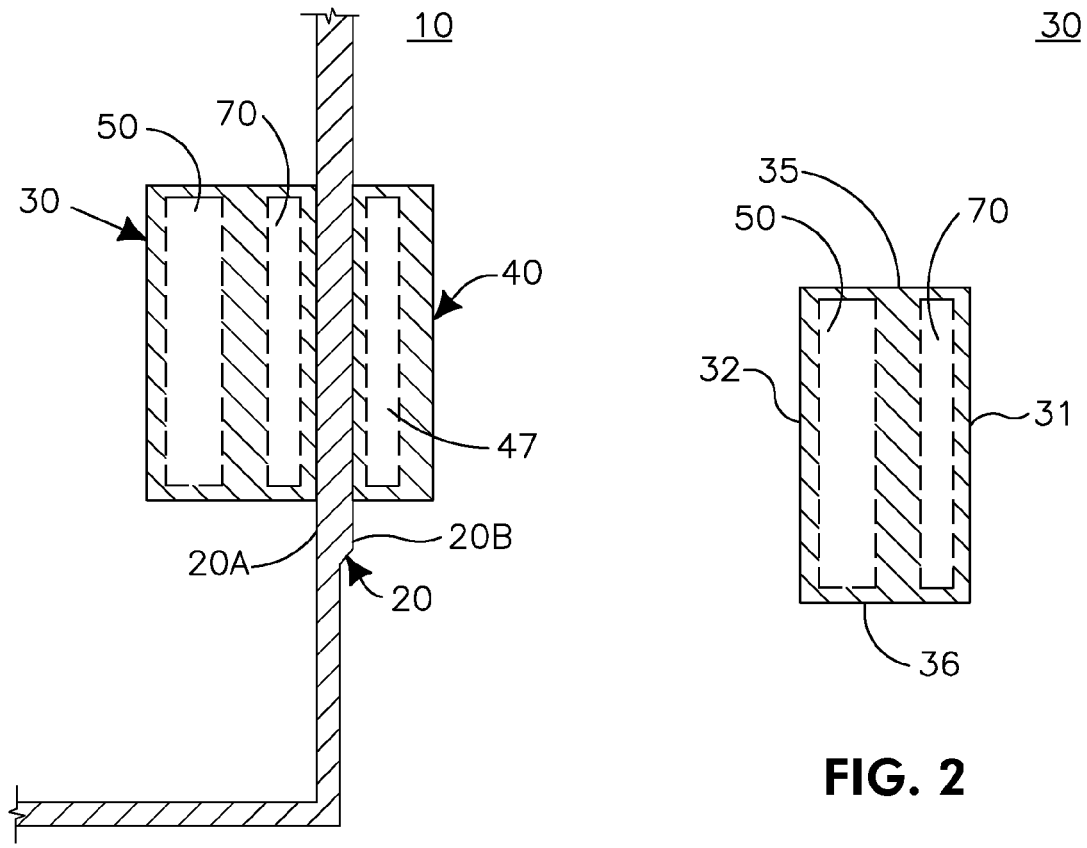
FIG. 1
FIG. 2
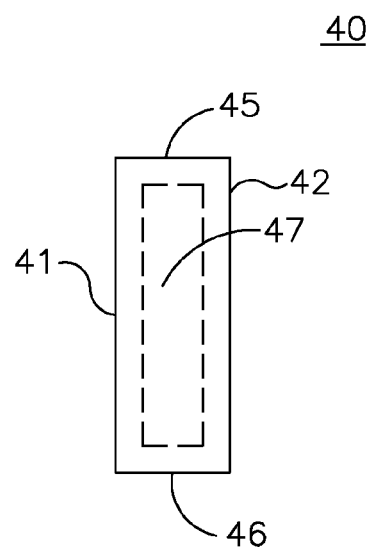
FIG. 3

MAGNETIC MOUNTING APPARATUS

CROSS REFERENCE TO RELATED APPLICATION

This application is a divisional of U.S. patent application Ser. No. 12/507,898, filed Jul. 23, 2009, which claims the benefit of U.S. Provisional Application No. 61/083,318, filed Jul. 24, 2008, both of which are incorporated herein by reference as if fully set forth.

FIELD OF INVENTION

This application pertains to mounting objects to other objects by a combination of magnetic attraction and physical retention.

BACKGROUND

Suction cups are commonly used in fish tanks or aquariums to secure various items such as heaters, thermometers, tubing and decorations, to the tank's walls and floor. When new, suction cups adhere well to the tank walls or floor. However, due to wear or deformation over time, suction cups may lose their ability to grip the tank wall or floor and eventually become detached.

SUMMARY

The present application is directed to an apparatus that attaches an accessory item by a combination of physical retention and magnetic attraction to a surface, such as the wall of a fish tank. It is also directed to other articles mounted with suction cups such as decorative items for refrigerators and windows such as sun-catchers, picture frames, other knick-knack items and the like.

The apparatus comprises two parts: a first support member and a second support member. Both support members contain synergistic, cooperating magnets that secure the support members together to a surface disposed between the two support members via their mutual attraction. Either of the two support members may also have one or more receptacles, such as a channel or a slot for accommodating and holding items, such as a heater, thermometer, tube, or decoration. The attachment side of these is placed into the receptacle, which retains and supports the items in a fixed position.

In one example of the embodiment, the apparatus may be used to mount a thermometer to a fish tank after the suction cup mounting mechanism of the thermometer has lost its capacity to maintain its suction ability. Particularly, the first and second support members are placed adjacent to each other on opposite sides of the tank wall. The suction cup of the thermometer is slipped into a slot in one of the support members to attach the thermometer to that support member. The support members secure each other in place on the wall of the fish tank through their magnetic attractive force.

BRIEF DESCRIPTION OF THE DRAWINGS

A more detailed understanding may be had from the following description, given by way of example in conjunction with the accompanying drawings, wherein:

FIG. 1 is sectional view of a magnetic mounting apparatus showing first and second support members with synergistic, cooperating magnets attached to the side wall of a tank;

FIG. 2 is a side view of the first support member of the magnetic mounting apparatus of FIG. 1;

FIG. 3 is a side view of the second support member of the magnetic mounting apparatus of FIG. 1;

FIG. 4 is a perspective view of an example first support member with one receptacle;

FIG. 5 is a perspective view of an alternative example of a first support member including a series of receptacles;

FIG. 6 is a side view of the first support member having a suction cup attached to a thermometer;

FIG. 7 is a side view of the magnetic mounting apparatus of FIG. 1 shown attached to the floor of a fish tank, with the first support member having a suction cup attached to an artificial decorative plant;

FIG. 8 is a perspective view of an alternative first support member of FIG. 2 formed of two interchangeable modules;

FIG. 9 is a perspective view of an alternate version of the first module of the first support member;

FIG. 10 is a perspective view of a module of the first support member that magnetically attaches to the second support member; and FIG. 11 perspective view of the two modules of the first support member mounted side by side.

DETAILED DESCRIPTION

Referring now to the drawings, wherein like reference numerals refer to the same components across the several views, and in particular to FIG. 1, a sectional view of the magnetic mounting apparatus 10 is shown. The magnetic mounting apparatus 10 may be attached to the walls or floor of a fish tank 20. The magnetic mounting apparatus 10 comprises a first support member 30 having a first magnet 70 and a second support member 40, having a second magnet 47 oriented such that the polarity of the second magnet 47 that faces the first magnet 70 is opposite in polarity to the polarity that it faces in the first magnet 70. Accordingly, the first magnet 70 cooperates with the second magnet 47 and causes the two support members, 30 and 40, to be magnetically attracted to each other, thereby sandwiching any surface in-between and causing the two support members, 30 and 40, to affix to a surface by friction. The first support member 30 and the second support member 40 are shown in FIG. 1 as having a generally cubic, or block, shape. However, the first support member 30 and the second support member 40 may be of any shape. The magnetic mounting apparatus 10 may be formed of a non-toxic plastic material or of a material free of heavy metal substances, such as lead or cadmium. It may also be formed of a durable material such as metal or plastic. However, other or additional materials may be used as long as they create a surface friction sufficient to prevent the mounting apparatus 10 from sliding off the mounting surface or object.

Referring now to FIG. 2, which is a side view of the first support member 30 of the magnetic mounting apparatus 10, the first magnet 70 may be embedded within the first support member 30 or, alternatively, attached to the front face 31, outside of the first support member 30, such that the front portion or the first magnet 70 abuts a surface, such as the wall of fish tank 20. As it can be seen from FIG. 2, in addition to the first magnet 70, the first support member 30 may also have a front face 31, a back face 32, a top face 35, a bottom face 36 and a receptacle 50.

The first magnet 70 may be in the form of a thin, flat shape. Alternatively, the first magnet 70 may be a series of spaced-apart magnets disposed within the first support member 30 or alternatively on the front face 31 (not shown). These spaced-apart magnets also may be disk-shaped or have a square or circular shape. The shape of the first support member 30, or the first magnet 70, should be complimentary to placing upon to a flat surface. The magnets may comprise permanent magnets and can include ceramic, ferrite, alnico, injection molded, flexible, rare earth, superconducting solenoid magnets (SMMs), and/or superconducting magnets (SCMs). As referred to above, the first support member 30 may include a receptacle 50, channel or other mechanism to hold an item. In the example depicted in FIG. 2, the first support member includes one receptacle, 50 for receiving and holding an accessory item 60.

Referring now to FIG. 3, which is a side view of the second support member 40 of the magnetic mounting apparatus 10, the second support member 40 may have a thin, flat shape, or may be substantially similar to the first support member 30. The second magnet 47 may be embedded within the second support member 40, or alternatively attached to the front face 41 of the second support member 40. In one example, the second magnet 47 may be positioned in the center of the second support member 40. Where the second support member 40 is substantially similar to the first support member 30, the second magnet 47 is positioned on the portion of the second support member 40 that abuts the tank surface 20B (as shown in FIG. 1). The second magnet 47 may be any of the type discussed above with respect to the first magnet 70. As it can be seen from FIG. 3, in addition to the second magnet 47, the second support member 40 may also have a front face 42, a back face 41, a top face 45, and bottom face 46.

Figure 6:
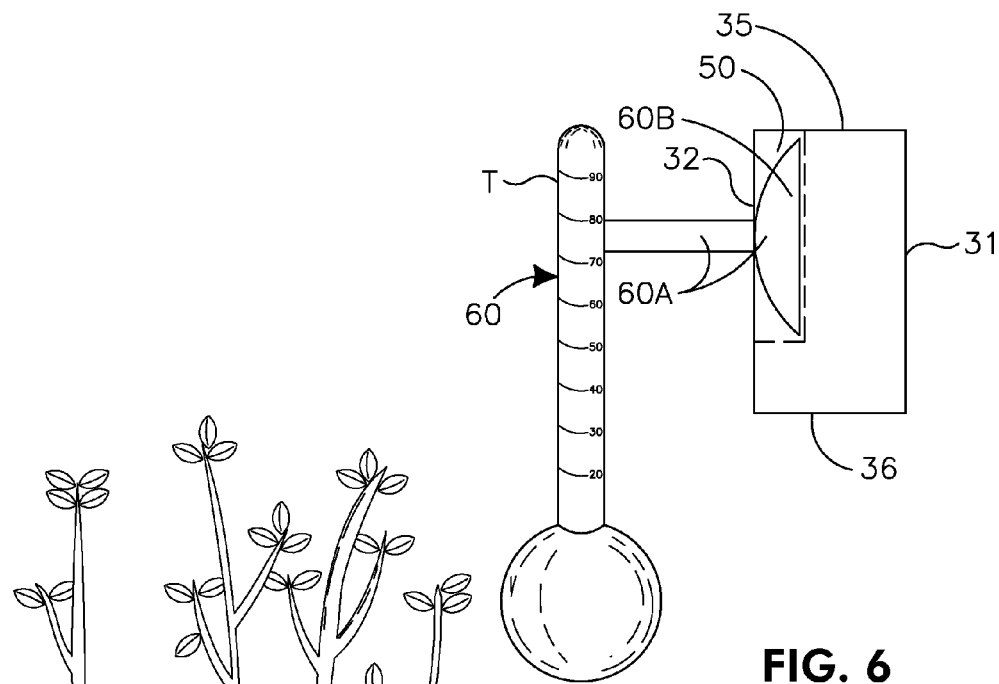
Figure 7:
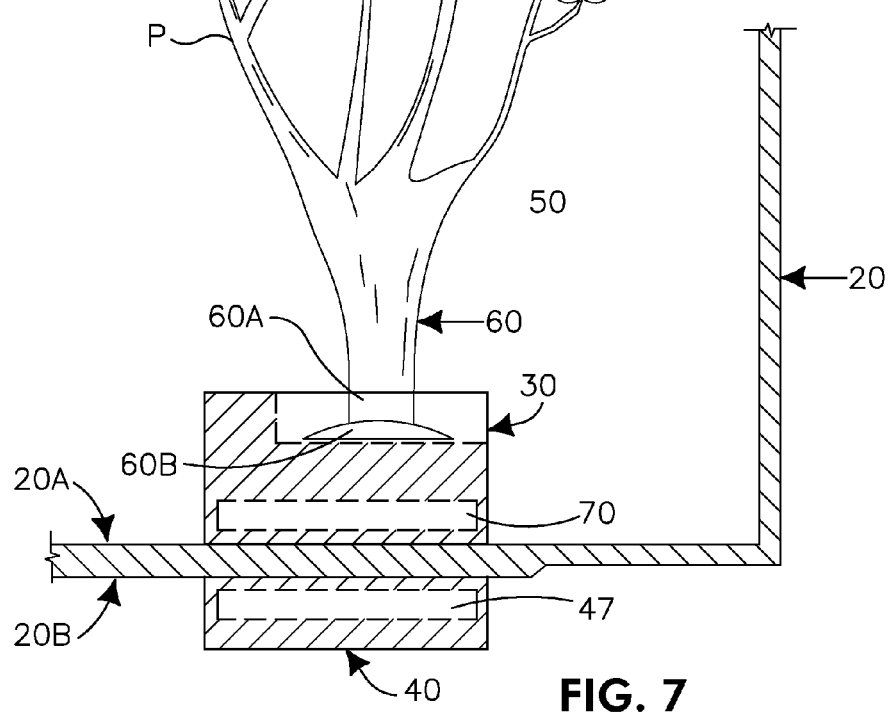

Referring to FIG. 4, a perspective view of an example first support member 30 with one receptacle 50 is shown. The receptacle 50 includes a first channel 51 and a second channel 52, both of which form a cavity. The receptacle 50 is open at the top face 35 of the first member 30 to allow for the insertion of an attachment accessory 60 (examples of which are shown in FIGS. 6 and 7). At the opposite end of the cavity, the receptacle 50 has a back slot 54. With respect to the first member 30, the back slot 54 on the back face 32 ends at or near the bottom face 36 of the first member 30. The receptacle 50 may be generally formed of a durable material such as metal or plastic; however, other or additional materials may be used. The receptacle 50 may receive and secure an attachment accessory 60 by inserting the first attachment member 60A and second attachment member 60B into the opening of the first channel 51. For the purpose of this example, the cavity is a T-shaped cavity having a T-shaped opening. It should be noted however that the cavity may be shaped in any other form. The horizontal portion of the T-shaped cavity is flat in the middle and turned inwardly at the ends so as to permit insertion of the first attachment member 60A and second attachment member 60B.

The diameter of the first attachment member 60A is smaller than the width of the T-shaped cavity, and smaller than the width of the first channel 51 of the receptacle 50. The diameter of the second attachment member 60B is smaller that the general width of the cavity, to permit insertion. However, the diameter of the second attachment member 60B is larger than the width of the first channel 51, to permit anchoring of the second attachment member 60B inside the first channel 51 of the receptacle 50. Accordingly, the first channel 51 of the receptacle 50 secures the attachment accessory 60, and prevents it from sliding out of the first support member 30. Furthermore, the back slot 54 of the receptacle 50 secures the attachment accessory 60, and prevents it from sliding downward or outward, depending on the orientation of the first support member 30.

Figure 5:
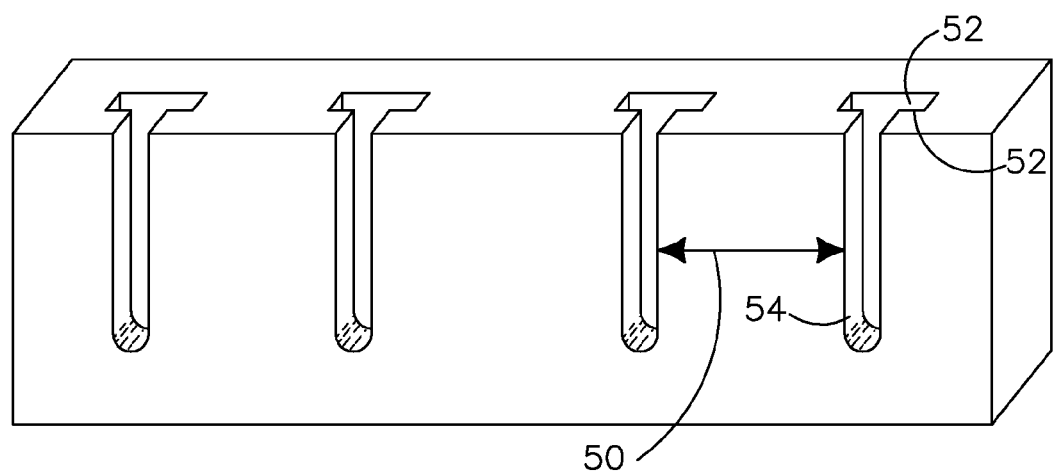

Referring to FIG. 5, an alternative example of the first support member 30', that includes a series of receptacles 50, is shown. Similar to the first support member 30, the first support member 30' may have a cube or block shape. However, the first support member 30' includes multiple receptacles 50 for receiving multiple attachment accessories 60.

Referring now again to FIG. 1, the attachment accessory 60 (as seen in FIGS. 6 and 7) may be attached to the tank 20 wall or floor in the following manner: the first support member 30 or 30' is placed inside the tank against the first surface 20A of the tank 20, which may be a glass or plastic wall or bottom, or other relatively thin, flat surface. The second support member 40 is placed at a corresponding position outside of the tank 20, and against the second surface 20B of the tank 20. The support members 30/30' and 40 are positioned such that they are in a complimentary position on opposite sides of the tank wall or bottom 20. The magnet 70 in the first support member 30/30' is placed to abut the surface 20A of the tank 20 with the front side 31 of the first support member 30/30' abutting the tank's surface 20A. The second support member 40 is positioned outside the tank 20 such that the pole in the second magnet 47 faces an unlike pole of the first magnet 70 within the tank 20.

The force due to the magnetic attraction between the dissimilar polarities of the first and second magnets 70, 47, retains the first and second support members 30/30' and 40 in the desired position on opposite sides of the tank surfaces 20A and 20B. By placing the support members 30/30' and 40 along any surface in a way that opposite polarities of the magnets, 70 and 47, the first and second support members, 30/30' and 40 are attracted to one another through the surface, 20. This magnetic attraction retains the support members 30/30' and 40 in a fixed position on the surface 20. The receptacle 50 then mechanically secures the attachment accessory 60, such as an object with a suction cup (as seen in FIGS. 6 and 7), against the surface 20A.

Referring to FIG. 6, a side view of the first support member 30 having a suction cup attached to a thermometer T is shown. In this example, the attachment accessory 60 is the thermometer T, having a first attachment member 60A and a second attachment member, (e.g., a suction cup), 60B inserted into the receptacle 50 of the support member 30. As a result, the receptacle 50, secures the accessory item 60.

Referring to FIG. 7, a side view of the magnetic mounting apparatus 10 of FIG. 1 is shown attached to the floor of the fish tank 20. In this example, an attachment accessory 60 is depicted as a decorative plant P attached to the tank 20. The first support member 30 is placed inside the tank 20 against the first surface 20A. The second support member 40 is placed at a corresponding position outside of the tank 20, against the second surface 20B of the tank 20. The support members, 30 and 40, are positioned such that they are in a complimentary position on opposite sides of the tank wall or bottom 20. The magnet 70 in the first support member 30 is placed to abut the surface 20A of the tank 20 with the first support member 30 abutting the tank's surface 20A. The second support member 40 is positioned outside the tank 20 such that the pole in the second magnet 47 faces an unlike pole of the first magnet 70 within the tank 20.

The force due to the magnetic attraction between the dissimilar polarities of the first and second magnets 70 and 47 again retains the support members 30 and 40 in a fixed position on the surface 20. Accordingly, the plant P is secured in the same manner as described above with regard to the thermometer T of FIG. 6.

A user may then easily detach or shift the position of an item placed inside the tank without the need of introducing his or her hands into the tank or touching the water. For example, a user may slide the second support member 40 on the surface outside the tank 20, causing the first support member 30 to move inside the tank 20 to the desired position because of the magnetic attraction between their respective magnets 70 and 47.

In an alternative embodiment, the first support member 30 may be formed from out of two separate modules, where one may remain attached to the surface and magnetically attracted to the second support member 40. The other module may be detachable, such that different types of modules could be used.

Figure 8:
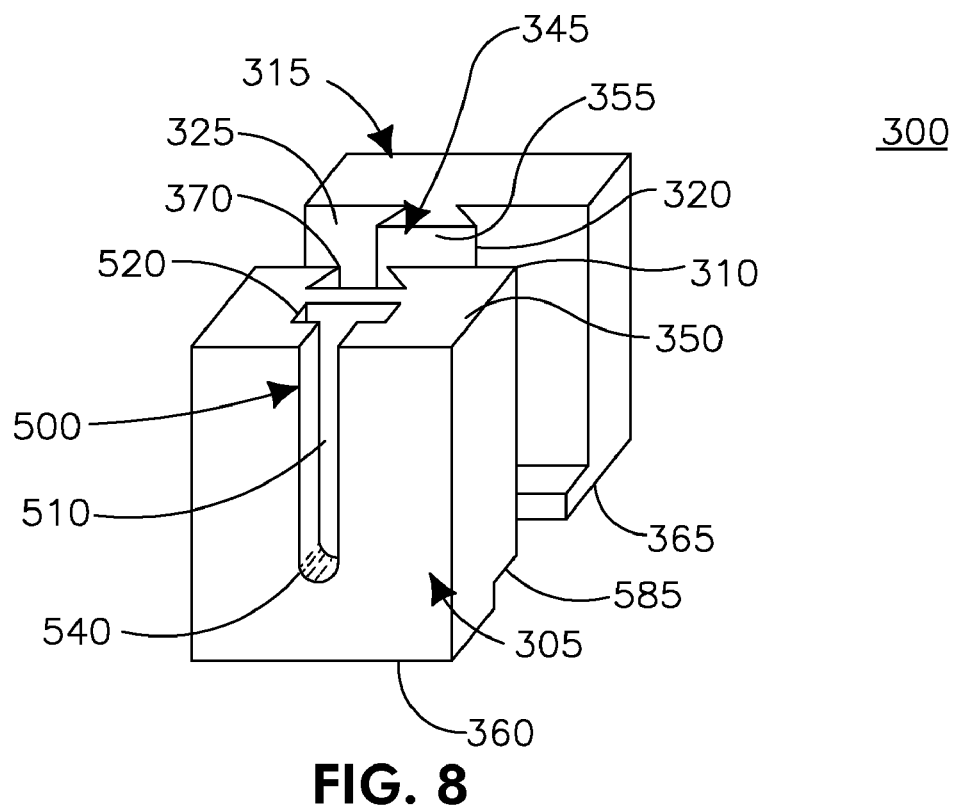

FIG. 8 is a perspective view of an alternative, modular, first support member 300. The modular first support member 300 includes a first module 305 and a second module 315. The first module 305 is attachable to the second module 315 by sliding it onto the second module.

Continuing to refer to FIG. 8, the first module 305 of the first support member 300 has a receptacle 500 as previously described with a keyed housing channel 370 and a catch 585 that allows it to lock/slide together with the second module 315. The second module 315 has a key 345 which locks with the keyed channel 360 of the first module 305 and rests against a rib 365 for vertically aligning the two modules 305, 315. The key 345 has also a front face 355 and two lateral faces, 320 325.

Additionally, the first module 305 of the modular first support member 300 includes a front face 310, a top face 350, a receptacle, 500, a bottom face 360 and a back face 320. The receptacle 500 includes a first channel 510 and a second channel 520, both of which form a cavity. The receptacle 500 is open at the top face 350 of the first module 305 to allow for the insertion of an attachment accessory such as the attachment accessories described above. At the opposite end of the cavity, the receptacle 500 has a back slot 540. With respect to the first module 305, the back slot 540 ends at or near the bottom face 360 of the first member 300. The receptacle 500 may be generally formed of a durable material such as metal or plastic; however, other or additional materials may be used. Various sized back slots in the receptacle 500 may allow it to receive and secure attachment accessories with different sized first attachment members 60A and second attachment members, (e.g., a suction cup), 60B. The front face 310 of the first module 305 includes a key housing channel 370 for attachment with the second module 315.

Figure 9:
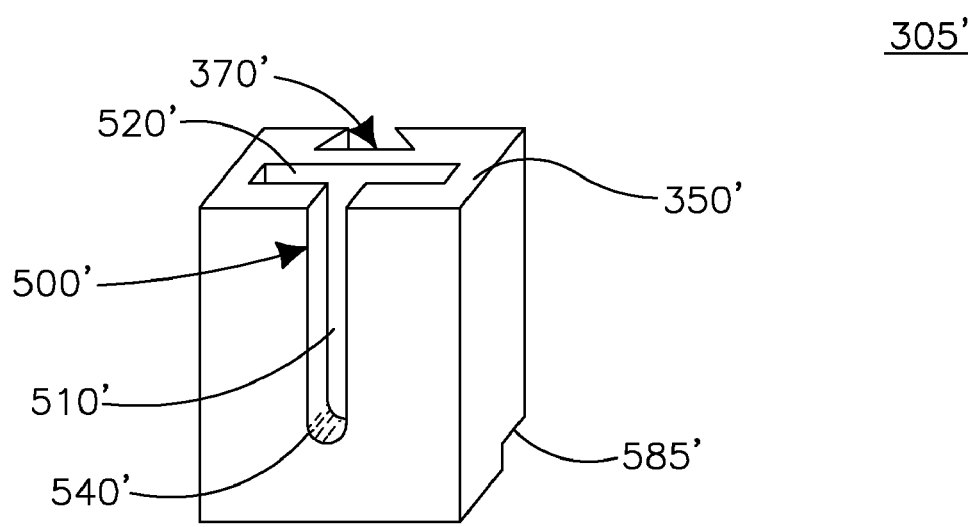

FIG. 9 illustrates an alternative first module 305' of the modular first support member 300 in an interchangeable embodiment. The receptacle 500' includes a first channel 510' and a second channel 520', both of which form a cavity with a back slot 540'. The receptacle 500' is open at the top face 350' of the first member 300 to allow for the insertion of an attachment accessory 60'. As shown in FIG. 9, the receptacle 500' is larger than the receptacle 500 of FIG. 8. In this manner, a different sized attachment accessory 60 with a different sized first attachment member and second attachment member, (e.g., a suction cup), can be slid into the receptacle 500' than the receptacle 500, and the alternative first module 305' can be slid onto the second module 315 without having to remove the second module 315 from being attached to a mounting surface. It should be noted however that the key housing channel 370' and the catch 585' of the alternative first module 305' is the same shape and dimensions as the key housing channel 370 and the catch 585 of the first module 305 and they are shaped to mate with the rib 365 and key 345 of the second module 315 of the first member 300.

Figure 10:
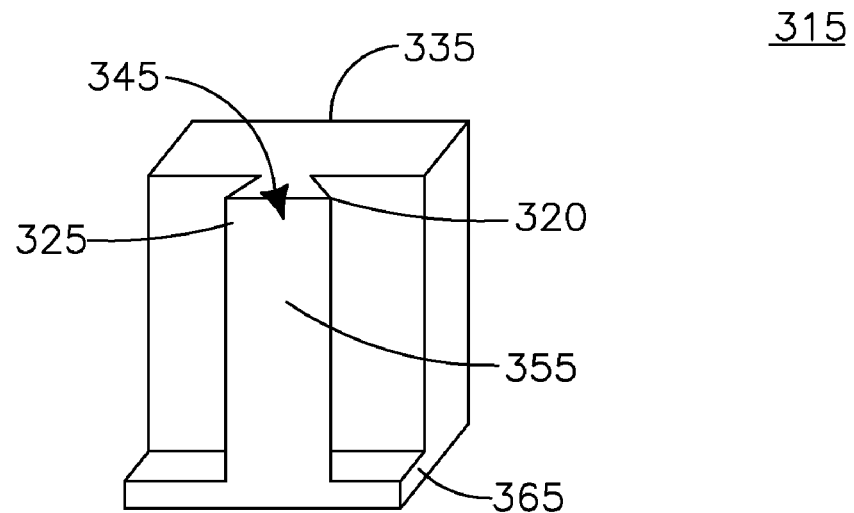

FIG. 10 illustrates the second module 315 of the first support member 300. The second module 315 magnetically attaches to the second support member 40 (not shown). The second module includes a key 345 shaped on the second module 315. The key 345 is shaped so as to be able to slide into the key housing channel 370 of the first module 305 or on the key housing channel 370' of the alternative first module 305'. The key 345 includes a front face 355 and two sidewalls 320 and 325. The key extends above the second module 315 at an oblique angle, heading away from the second module body. The key also includes a rib 365 parallel to the top face 335 of the second module 315 which is shaped to mate with the catch 365 of the first module 305, 305' for vertical alignment with the first module.

Figure 11:
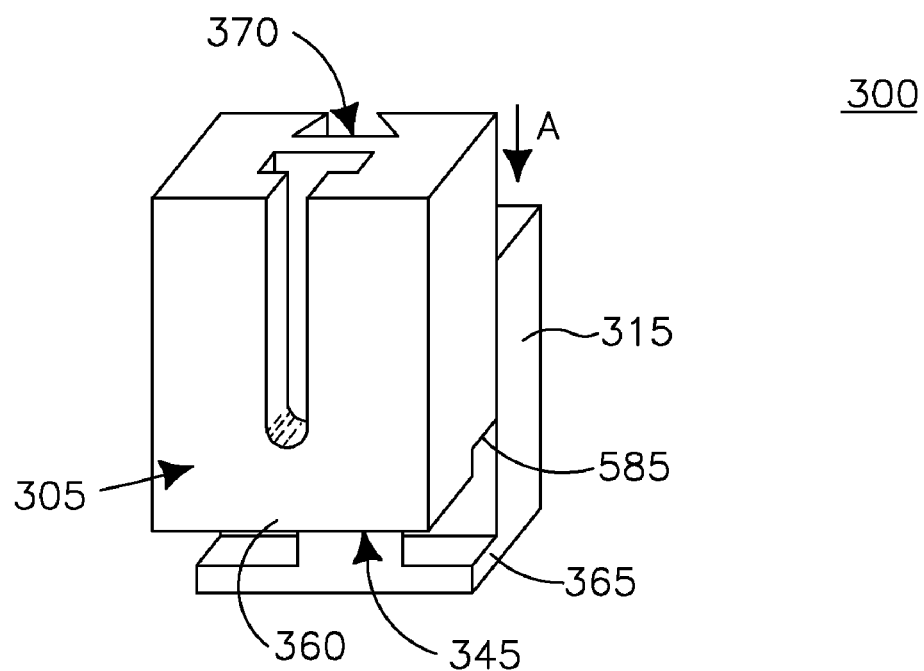

FIG. 11 illustrates a perspective view of the two modules 305, 315 of the first support member 300 partially mounted together side by side with the lock and key engaged. The first module 305 is positioned vertically to the second module 315 with the key housing channel 370 facing inwardly towards the key 34 of the second support member 315. The first module 305 slides down with the key housing channel 370 facing inwardly onto the key 345 of the second module 315, and interlocks the first module 305 and the second module 315. Further, the bottom face 360 of the first module 305 meets the rib 365 of the second module and the catch 585 of the first module 305 engages the rib 365 of the second module for vertically aligning the two modules 305, 315 preventing separation.

Changes or modifications may be made to the above-described embodiments without departing from the scope and spirit of the invention as set forth in the claims.

What is claimed is:

1. A magnetic mounting apparatus, comprising:
   a first modular support member, having an interchangeable first module and a second module, the first module being configured to slide onto the second module;
   the first module comprising:
      a first receptacle having a first channel of a first width and a second channel of a second width greater than the first width, the first and second channels forming a cavity with an opening at a first surface of the first module and proceeding toward a second surface of the first module opposite to the first surface;
      a keyed housing channel; and
      a catch;
   the second module comprising:
      a key on the second module adapted to mate with the keyed housing channel and the catch of the first module such that the first module attaches to the second module; and
      a first magnet; and
   a second support member, including a second magnet that is oriented to mate with the first magnet of the first modular support member.

2. The magnetic mounting apparatus of claim 1 wherein the second module further comprises the key extending at an oblique angle away from the second module body.

3. The magnetic mounting apparatus of claim 2 wherein the second module further comprises a rib oriented to mate with the catch of the first module.

4. The magnetic mounting apparatus of claim 3 wherein the first module is positioned vertically to the second module with the keyed housing channel facing the key of the second module and slid down onto the key and wherein the first module interlocks with the second module by the rib of the second module engaging the catch of the first module and by vertically aligning the first module and the second module to prevent separation.

5. A magnetic mounting apparatus, comprising:
   a first modular support member, having an interchangeable first module and a second module, the first module being configured to slide onto the second module;

the first module comprising:
a first receptacle having a first channel of a first width and a second channel of a second width greater than the first width, the first and second channels forming a cavity with an opening at a first surface of the first module and proceeding toward a second surface of the first module opposite to the first surface;
a keyed housing channel having an opening on a front face of the first module that is smaller than a back wall of the keyed housing channel and side walls of the keyed housing channel extending at an angle from the opening to the back wall; and
a catch formed as a recessed portion on a bottom face of the first module;
the second module comprising:
a key on the second module adapted to mate with the keyed channel housing and the catch of the first module such that the first module attaches to the second module; and
a first magnet; and
a second support member, including a second magnet that is oriented to mate with the first magnet of the first modular support member.

6. The magnetic mounting apparatus of claim 5 wherein the second module further comprises the key extending at an oblique angle away from the second module body.

7. The magnetic mounting apparatus of claim 6 wherein the second module further comprises a rib oriented to mate with the catch of the first module.

8. The magnetic mounting apparatus of claim 7 wherein the first module is positioned vertically to the second module with the keyed housing channel facing the key of the second module and slid down onto the key and wherein the first module interlocks with the second module by the rib of the second module engaging the catch of the first module and by vertically aligning the first module and the second module to prevent separation.

9. A magnetic mounting apparatus, comprising:
a first modular support member, having an interchangeable first module and a second module, the first module being configured to slide onto the second module;
the first module comprising:
a first receptacle having a first channel of a first width and a second channel of a second width greater than the first width, the first and second channels forming a T-shaped cavity with an opening at a top surface of the first module and proceeding toward a bottom surface of the first module opposite to the top surface, wherein the first and second channels are each defined by a pair of surfaces facing one another and extending substantially parallel to each other, each pair of surfaces defining the first and second channels are offset from each other, and the cavity terminating proximate to the bottom surface of the first module and forming a closed rounded bottom back slot;
a keyed housing channel having an opening on a front face of the first module that is smaller than a back wall of the keyed housing channel and side walls of the keyed housing channel extending at an angle from the opening to the back wall; and
a catch formed as a recessed portion on the bottom surface of the first module;
the second module comprising:
a key on the second module adapted to mate with the keyed channel housing and the catch of the first module such that the first module attaches to the second module; and
a first magnet; and
a second support member, including a second magnet that is oriented to mate with the first magnet of the first modular support member.

10. The magnetic mounting apparatus as in claim 9, further comprising a third module configured to slide onto the second module, the third module including:
a first receptacle having a first channel of a first width and a second channel of a second width greater than the first width, the first and second channels forming a T-shaped cavity with an opening at a top surface of the third module and proceeding toward a bottom surface of the third module opposite to the top surface, wherein the first and second channels are each defined by a pair of surfaces facing one another and extending substantially parallel to each other, each pair of surfaces defining the first and second channels are offset from each other, and the cavity terminating proximate to the bottom surface of the third module and forming a closed rounded bottom back slot;
a keyed housing channel having an opening on a front face of the third module that is smaller than a back wall of the keyed housing channel and side walls of the keyed housing channel extending at an angle from the opening to the back wall; and
a catch formed as a recessed portion on the bottom surface of the third module;
wherein the cavity of the third module is of a different size than the cavity of the first module.

11. The magnetic mounting apparatus as in claim 10 wherein the cavity of the third module is smaller than the cavity of the first module.

12. The magnetic mounting apparatus as in claim 10 wherein the cavity of the third module is larger than the cavity of the first module.

13. A magnetic mounting apparatus, comprising:
a first modular support member, having an interchangeable first module and a second module, the first module being configured to slide onto the second module;
the first module comprising:
a first receptacle having a first channel of a first width and a second channel of a second width greater than the first width, the first and second channels forming a cavity with an opening at a first surface of the first module and proceeding toward a second surface of the first module opposite to the first surface; and
a key;
the second module comprising:
a catch formed as a recessed portion on a bottom face of the second module;
a keyed housing channel on the second module adapted to mate with the key of the first module such that the first module attaches to the second module; and
a first magnet; and
a second support member, including a second magnet that is oriented to mate with the first magnet of the first modular support member.

* * * * *